United States Patent [19]

Fredelius

[11] Patent Number: 5,094,576
[45] Date of Patent: Mar. 10, 1992

[54] TELESCOPIC CARGO BAR

[76] Inventor: Claes Fredelius, Vastra Palettgatan 6, S-421 66 Västra Frölunda, Sweden

[21] Appl. No.: 540,091

[22] Filed: Jun. 19, 1990

[30] Foreign Application Priority Data

Jun. 19, 1989 [SE] Sweden .................. 8902215-6

[51] Int. Cl.⁵ .................................................. B60P 7/06
[52] U.S. Cl. ...................................... 410/151; 410/145
[58] Field of Search .................................. 410/143–145, 410/148–151

[56] References Cited

U.S. PATENT DOCUMENTS

| | | | |
|---|---|---|---|
| 2,627,821 | 2/1953 | Sjogren | 410/145 |
| 3,049,328 | 8/1962 | Bishop | 410/151 X |
| 3,110,506 | 11/1963 | O'Brien | 410/151 |
| 4,456,415 | 6/1984 | Joice-Cavanagh | 410/151 X |
| 4,473,331 | 9/1984 | Wisecarver | 410/151 X |
| 4,781,499 | 11/1988 | Wisecarver | 410/151 |

OTHER PUBLICATIONS

"The Book of Cargo Protection", Bishop-Wisecarver, 1986.

Primary Examiner—Robert J. Spar
Assistant Examiner—William M. Hienz
Attorney, Agent, or Firm—Ostrolenk, Faber, Gerb & Soffen

[57] ABSTRACT

A telescopic cargo bar having a jack comprising a rack and a gear segment cooperating therewith, the gear segment being connected to a control handle, which is pivotally connected to the outer telescopic member, the jack further is provided with a latch, which in a first latch position latches the handle in a first locking position. The latch further comprises a second latch position arranged to latch the handle in a second locking position located between the first locking position and the open position. This second latch position is arranged to prevent the handle from being brought past the latch before the gear segment is released from the rack. The handle can be brought past the second latch position to open position by manual actuation of the latch.

15 Claims, 3 Drawing Sheets

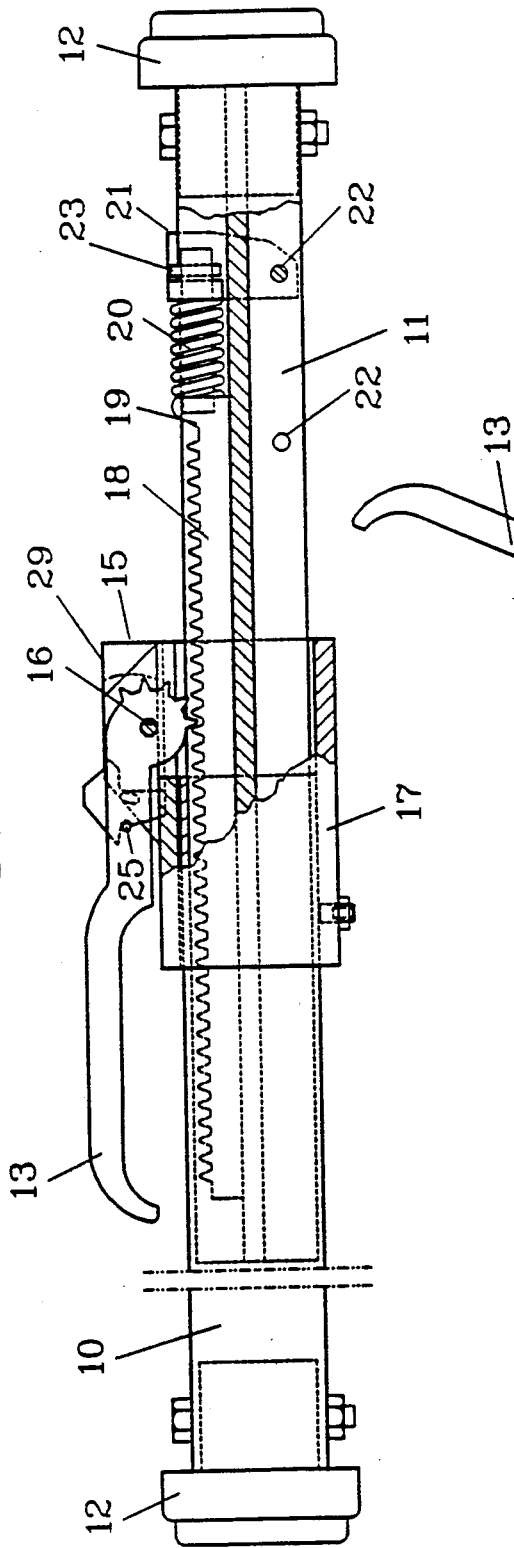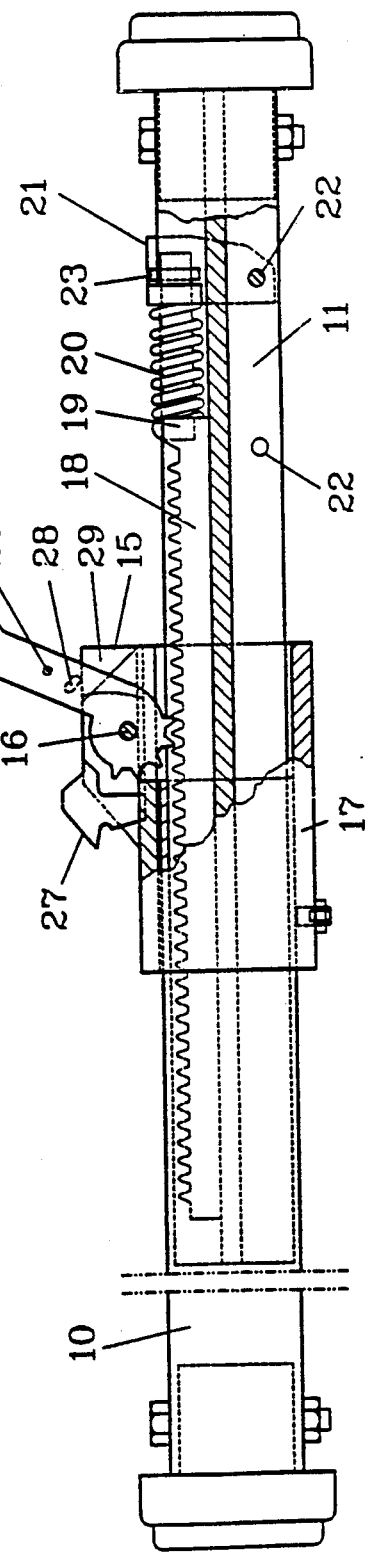

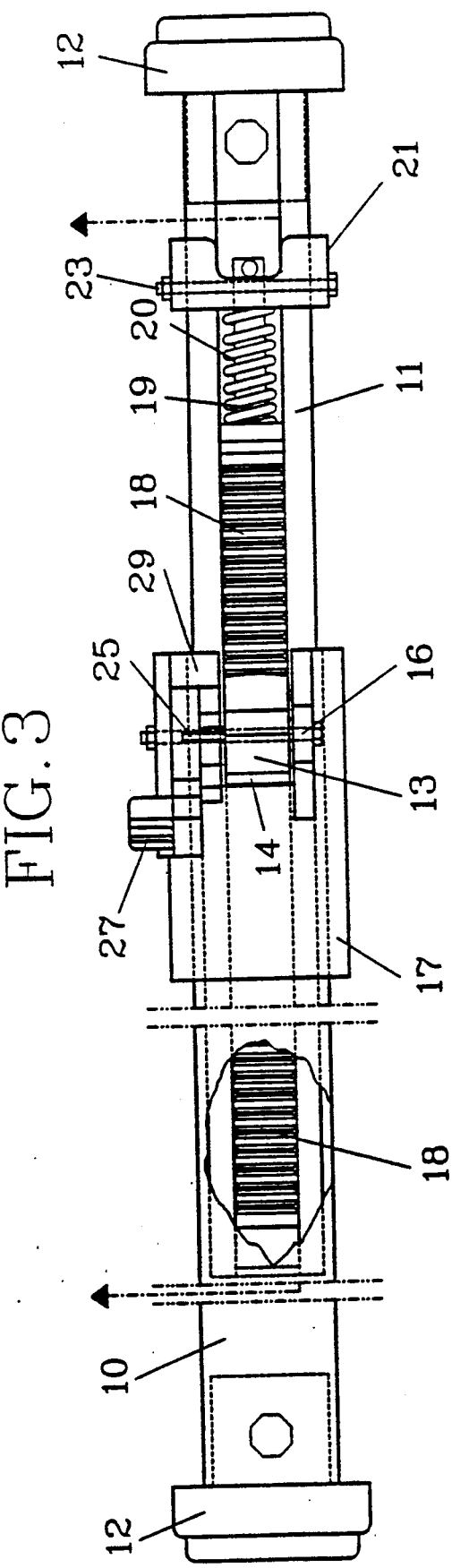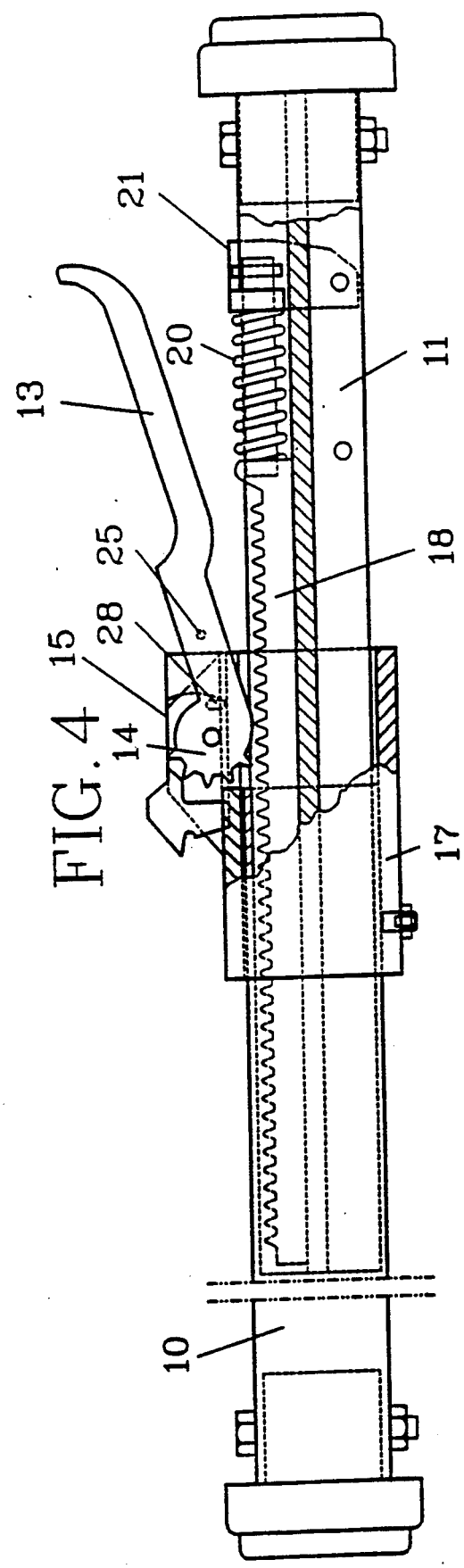

TELESCOPIC CARGO BAR

TECHNICAL FIELD

The present invention refers to a cargo bar comprising a pair of telescopically displaceable members, a jack mounted thereon for providing a relative displacement of said telescopic members and for locking them in a desired position, said jack having a rack or the like and a gear segment or the like cooperating with said rack, said gear segment being connected to a control handle, which is pivotally connected to the first telescopic member, said jack further is provided with a latch means, which in a first latch position latches the handle in a first locking position and manually can be brought out of said first latch position, so that the handle can be pivoted past the latch means to an open position, in which the gear segment is brought out of engagement with the rack so that the telescopic members can be displaced relative to each other, said cargo bar further comprising at least one spring for providing a gripping pressure when the cargo bar is braced between opposing walls of a cargo container or the like.

BACKGROUND OF THE INVENTION

Cargo bars of the above kind are used for locking loads on vehicle platforms, in holds on ships etc. and are braced between opposing walls or between the floor and ceiling in the cargo space. Examples of such cargo bars are shown in e.g. the U.S. Pat. Nos. 3,995,565; 4,669,934; 4,781,499 and 3,049,328.

A problem with telescopic cargo bars of this kind is when releasing the cargo bar, especially from vertical position, and the handle is brought out of locking position, the inner telescopic member will rapidly slide into the outer telescopic member, which involves a big substantial risk squeeze injuries. A further drawback is that after each time the cargo bar has been released, a new length adjustment of the cargo bar must be done before it is installed again.

SUMMARY OF THE INVENTION

The object of the present invention is to provide a cargo bar, which has a latch assembly by means of which the above mentioned risk for injuries is avoided, and which further can be released and installed again with retained length adjustment. This has been achieved in that the latch means is provided with a second latch position arranged to latch the handle in a second locking position located between said first locking position and the open position, said second latch position is arranged to prevent the handle from being brought past the latch means before the gear segment is released from the rack, and that by manual actuation of the latch means the handle can be brought past the second latch position to open position.

Further features of the cargo bar according to the present invention are stated in the subsequent claims and provides further advantages such as a compact and simple design.

DESCRIPTION OF THE DRAWINGS

The invention will below be closer described with reference to an embodiment shown in the accompanying drawings.

FIG. 1 is a partly broken side view of a cargo bar according to the invention showing the latch assembly in the first latch position.

FIG. 2 shows the latch assembly according to FIG. 1 in the second latch position.

FIG. 3 shows in a view from above the latch assembly according to claim 2.

FIG. 4 shows the latch assembly in open position.

DESCRIPTION OF AN EMBODIMENT

Figure 5:
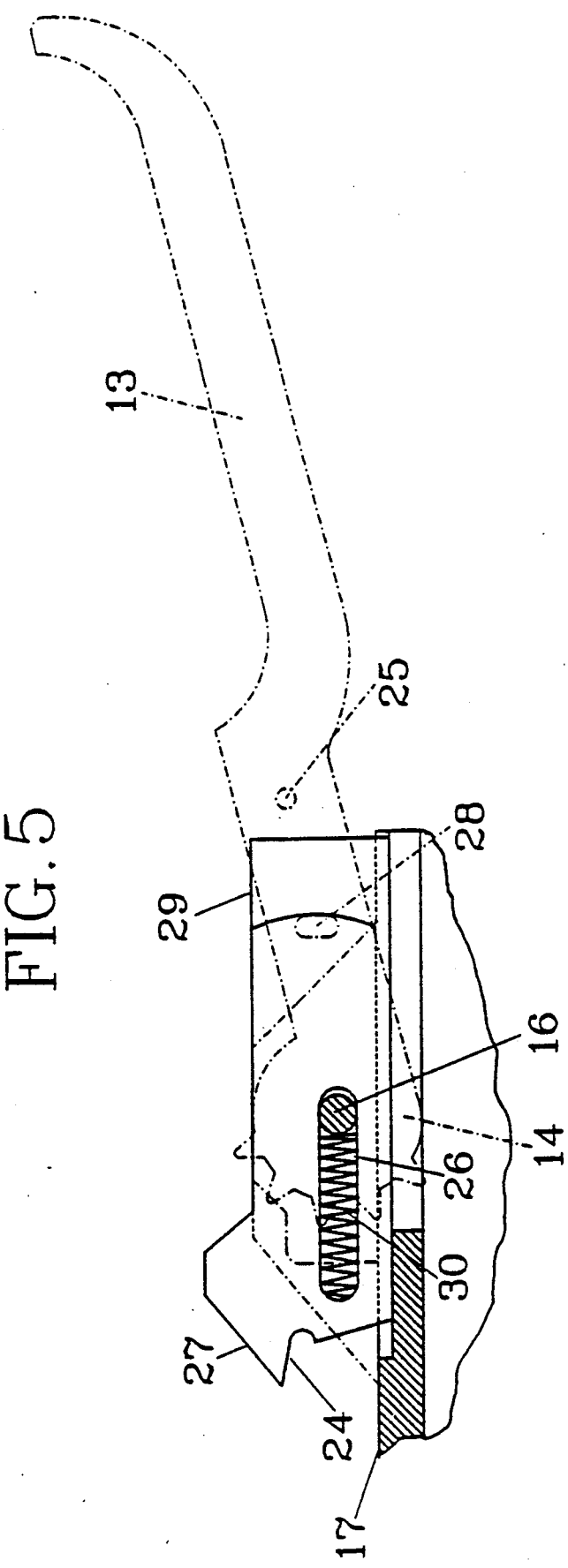
FIG. 5 shows on a larger scale a side view of the control handle and the latch bolt cooperating therewith.

The cargo bar comprises an outer tube 10 and an inner substantially H-shaped profile 11, which is telescopically displaceable in the tube 10. The tube 10 and the profile 11 are at their outer ends provided with a contact pad 12 each adapted to frictionally engage the contact surfaces, i.e. the walls, ceiling and/or floor of the cargo space (not shown), between which the cargo bar is braced.

On the outside of the tube 10 there is mounted a latch assembly comprising a control handle 13 and integral therewith a gear segment 14 and a latch bolt 15. The gear segment 14 and the handle 13 connected thereto are pivoted about a pin 16 attached in a housing 17, which is fixedly mounted on the outside of the tube 10. The latch bolt 15 is mounted on the pin 16 and is provided with an oblong hole 26, along which the latch bolt 15 can be displaced on the pin 16 against the action of a spring 30.

The gear segment 14 cooperates with a rack 18 arranged inside the profile 11. The outer end of the rack 18 located outside the tube 10 is integral therewith provided with a pin 19, about which a coil spring 20 is arranged. The spring is clamped between the end termination of the rack 18 and an attachment means 21 mounted on the outside of the profile 11. The profile 11 is preferably provided with a plurality of mounting holes 22 for said attachment means 21, said holes being arranged on appropriate distances, so that the position of the attachment means 21 and the rack 18 in the profile 11 can be adjusted for length adjustment of the cargo bar. As an example it can be mentioned that for a length of about 40 cm for the rack 18 it can be suitable to arrange mounting holes 22 at spaces of about 30 mm. A locking pin 23 at the free end of the pin 19 prevents the pin 19 from sliding out of the attachment means 21 and when this is moved the prestressing of spring 20 in the attachment means 21 is retained.

In the position shown in FIG. 1, in which the handle is folded down, the latch assembly is in latching position and the gear segment 14 engages the rack 18. The latch bolt 15 cooperates with a first stops 25 on the handle 13 and keeps this latched in the first latching position. The latch bolt 15 has an oblique grooved gripping surface 27, against which e.g. the thumb is pressed at the same time as the other fingers grip the handle 13. By pressing the latch bolt 15 to the right according to FIG. 1, against the action of the spring 30, the first stop 25 of the handle 13 can be. brought past a first stop face 24 on the latch bolt 15 and be pivoted upwards until a second stop 28 on the handle 13 abuts a second stop face 29 on the latch bolt 15, which makes a second latching position (FIG. 2). In this second latching position the gear segment 14 is still in engagement with the rack 18, and the profile 11 is prevented from sliding into the tube 10. In order to bring the handle 13 past the second latching position the latch bolt 15 must again be pressed to the right according to FIG. 2, so that the second stop 28 of the handle 13 can be brought past the second stop face 29 of the latch bolt 15 to the open position shown in FIG. 4. The gear segment 14 is now completely released from the rack and the profile 11 can be displaced in the tube 10.

When the cargo bar is installed, e.g. between the walls of a cargo space, the latch assembly is brought to open position, so that the position of the profile 11 in the tube 10 can be adjusted so that a suitable length of the bar is achieved, i.e. both contact pads 12 are engaging the walls. The cargo bar is then braced by pivoting the handle downwards to its first locking position, in which the spring 20 is stressed and provides a gripping pressure against the walls. When the cargo bar is to be removed the handle 13 needs only be brought to the second locking position, since the stroke between the first and second locking positions is a few centimeters, which permits removal of the cargo bar. The length adjustment of the cargo bar is thus retained and no new length adjustment is needed next time the cargo bar is installed on the same place.

The invention is of course not limited to the embodiment shown in the drawings, but a plurality of modifications of the design of the constructive elements are possible within the scope of the claims.

I claim:

1. A cargo bar for bracing two opposed surfaces of a cargo container, the cargo bar comprising:

an inner member and an outer member, the outer member disposed outside the inner member, the inner and the outer members being telescopically slidably displaceable;

a first spring for providing a gripping pressure when the cargo bar is braced between the opposed surfaces of the cargo container, the spring being coupled to one of the members and providing a biasing force between said members;

means mounted on one of the members for providing a controlled telescopic displacement of the inner and outer members and for locking the members, said means for providing controlled telescopic displacement comprising a rack and a gear segment which cooperates with the rack, the gear segment being connected to a control handle, the control handle being pivotally connected to one of the members, the means for providing controlled telescopic displacement further being provided with a latch means, the latch means having a first latch position at which it latches the handle against movement in a first handle position and at which the members are at a first relative displacement and are locked against relative movement, the handle being pivotable past the latch means and out of the first handle position to an open position only after manual actuation of the latch means out of the first latch position, the gear segment in the open position of the handle being brought out of engagement with the rack so that the members are freely telescopically displaceable relative to each other;

the handle being pivotable to an intermediate position between the open and first handle positions, the latch means preventing movement of the handle past the intermediate position towards the open position until further manual actuation of the latch means occurs, wherein when the handle is in said intermediate position and said handle movement is prevented, the gear segment and rack remain in engagement and the members are at a second relative displacement and locked against relative movement, enabling the cargo bar to be released from said cargo container opposed surfaces.

2. A cargo bar according to claim 1, wherein the handle has two stops, and the latch means comprises a latch bolt displaceable in an axial direction of the cargo bar against the bias of a second spring, the latch bolt having two stop faces one stop face cooperating with the first stop when the handle is in the first handle position and the second stop face cooperating with the second stop when the handle is in the intermediate position.

3. A cargo bar according to claim 1, wherein the inner member has a substantially H-shaped profile comprising two U-shaped profiles back-to-back, the rack being arranged within one of the U-shaped profiles.

4. A cargo bar according to claim 3, wherein the rack has an outer surface located outside the outer telescopic member, the outer surface of the rack being attached to or integral with a pin about which the first spring is arranged, the first spring further being connected to the inner member by an attachment means.

5. A cargo bar according to claim 4, wherein the rack has two ends and wherein the first spring is clamped between one end of the rack and the attachment means connected to the inner member.

6. A cargo bar according to claim 5, wherein the inner member is provided with a plurality of holes at different positions along its length, the attachment means being selectively fastenable to the holes at said different hole positions along the inner member to provide an initial rough adjustment to a dimension less than a dimension between the two opposed surfaces of the cargo container, but such that the cargo bar can engages said two opposed surfaces securely when said members are at said first relative displacement.

7. A cargo bar according to claim 2, wherein the inner member has a substantially H-shaped profile comprising two U-shaped profiles back-to-back, the rack being arranged within one of the U-shaped profiles.

8. A cargo bar for bracing two opposed surfaces of a cargo container, the cargo bar comprising:

an inner member and an outer member, the outer member disposed outside the inner member, the inner and the outer members being telescopically slidably displaceable;

a first biasing means for providing a gripping pressure when the cargo bar is braced between the opposed surfaces of the cargo container, the biasing means being coupled to one of the members and providing a biasing force between the members;

means mounted on one of the members for providing a controlled telescopic displacement of the inner and outer members and for locking the members, said means for providing controlled telescopic displacement having a control handle, the control handle being pivotally connected to one of the members, the means for providing controlled telescopic displacement further being provided with a latch means, the latch means having a first latch position at which it latches the handle against movement in a first handle position and at which the member are at a first relative displacement and are locked against relative movement, the handle being pivotable past the latch means and out of the first handle position to an open position only after manual actuation of the latch means out of the first latch position, the means for providing controlled telescopic displacement in the open position of the handle being disengaged so that the members are freely telescopically displaceable relative to each other;

the handle being pivotable to an intermediate position between the open and first handle positions, the latch means preventing movement of the handle past the intermediate position towards the open position until further manual actuation of the latch means occurs, wherein when the handle is in said intermediate position and said handle movement is prevented, the members are at a second relative displacement and locked against relative movement, enabling the cargo bar to be related from said cargo container opposed surfaces.

9. The cargo bar recited in claim 8, wherein said means for providing controlled telescopic displacement comprises a rack and gear segment, the handle being coupled to the gear segment and being pivotable with the gear segment about a center of the gear segment, said gear segment being disengaged from the rack in the open position, but being engaged with the rack at different points on the rack when the members are at their first and second relative displacements.

10. A cargo bar according to claim 9, wherein the biasing means comprises a first spring.

11. A cargo bar according to claim 10, wherein the handle has two stops, and the latch means comprises a latch bolt displaceable in an axial direction of the cargo bar against the bias of a second spring, the latch bolt having two stop faces, one stop face cooperating with the first stop when the handle is in the first handle position and the second stop cooperating with the second face when the handle is in the intermediate position.

12. A cargo bar according to claim 9, wherein the inner member has a substantially H-shaped profile comprising two U-shaped profiles back-to-back, the rack being arranged within one of the U-shaped profiles.

13. A cargo bar according to claim 12, wherein the rack has an outer surface located outside the outer telescopic member, the outer surface of the rack being attached to or integral with a pin about which the first spring is arranged, the first spring further being connected to the inner member by an attachment means.

14. A cargo bar according to claim 13, wherein the rack has two ends and wherein the first spring is clamped between one end of the rack and the attachment means connected to the inner member.

15. A cargo bar according to claim 14, wherein the inner member is provided with a plurality of holes at different positions along its length, the attachment means being selectively fastenable to the holes at said hole different positions along the inner member to provide an initial rough adjustment to a dimension less than a dimension between the two opposed surfaces of the cargo container, but such that the cargo bar can engages said two opposed surfaces securely when when said members are at said first relative displacement.

* * * * *